United States Patent
Wandelt (10) Patent No.: US 8,979,417 B2
(45) Date of Patent: Mar. 17, 2015

(54) ATTACHMENT SYSTEM (75) Inventor: Dennis Wandelt, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 127 days.

(21) Appl. No.: 13/182,737

(22) Filed: Jul. 14, 2011

(65) Prior Publication Data

US 2013/0017014 A1  Jan. 17, 2013

(51) Int. Cl.
F16B 7/04 (2006.01)
F16B 5/02 (2006.01)
F16B 37/00 (2006.01)
F16B 37/08 (2006.01)

(52) U.S. Cl.
CPC ............... F16B 5/025 (2013.01); F16B 37/005 (2013.01); F16B 37/085 (2013.01)
USPC ........................................ 403/350; 403/408.1

(58) Field of Classification Search
USPC ........................ 403/348, 350, 351, 352, 408.1; 411/301, 349, 418, 546, 549, 553
See application file for complete search history.

(56) References Cited

U.S. PATENT DOCUMENTS

| | | | | |
|---|---|---|---|---|
| 3,842,877 | A * | 10/1974 | Andrews | 411/301 |
| 5,094,618 | A * | 3/1992 | Sullivan | 433/173 |
| 7,179,036 | B2 * | 2/2007 | Griffin et al. | 411/301 |
| 7,241,097 | B2 | 7/2007 | Dembowsky et al. | |
| 7,682,120 | B1 * | 3/2010 | Goldbaum | 411/418 |
| 7,748,089 | B2 * | 7/2010 | Jalbert et al. | 411/508 |
| 7,762,752 | B2 * | 7/2010 | Kato | 411/418 |
| 8,066,465 | B2 * | 11/2011 | Figge et al. | 411/546 |
| 2002/0131843 | A1 * | 9/2002 | Chen-Chi et al. | 411/418 |
| 2005/0270790 | A1 | 12/2005 | Kreutzberg | |
| 2009/0067921 | A1 * | 3/2009 | Ito et al. | 403/408.1 |
| 2009/0190993 | A1 * | 7/2009 | De Gelis | 403/47 |

FOREIGN PATENT DOCUMENTS

| | | |
|---|---|---|
| DE | 1 867 188 U | 2/1963 |
| DE | 199 32 660 A1 | 2/2001 |
| DE | 10 2004 005 978 A1 | 9/2005 |
| DE | 20 2005 016 544 U1 | 2/2006 |
| DE | 10 2005 044 064 A1 | 3/2007 |
| DE | 10 2009 035 831 A1 | 9/2010 |
| EP | 1 669 614 A1 | 6/2006 |
| WO | WO 94/07040 A1 | 3/1994 |
| WO | 201 19 112 U1 | 4/2002 |
| WO | WO 03/052279 A2 | 6/2003 |

* cited by examiner

*Primary Examiner* — Michael P Ferguson
(74) *Attorney, Agent, or Firm* — Muncy, Geissler, Olds & Lowe, P.C.

(57) ABSTRACT

An attachment system for attaching a first component to a second component is provided, the system including a cylindrical element which has an outer lateral surface and a sleeve-shaped element which has an inner lateral surface, by means of which the two components may be variably attached to each other. At least one rib is arranged on one of the lateral services of the cylindrical or sleeve-shaped element and is oriented substantially perpendicularly to the axis of the cylindrical and sleeve-shaped elements. A projection is arranged on the other lateral surface of the sleeve-shaped or cylindrical element, the rib and the projection being provided on the cylindrical and sleeve-shaped elements in such a way that the sleeve-shaped element may be mounted on the cylindrical element, and the cylindrical element may be rotated relative to the mounted sleeve-shaped element in variable axial positions around the axis. The rib is brought into communication with the projection during rotation, and the cylindrical element being thereby fixed in place relative to the mounted sleeve-shaped element in the axial direction.

17 Claims, 6 Drawing Sheets

ATTACHMENT SYSTEM

BACKGROUND OF THE INVENTION

1. Field of the Invention

The present invention relates to an attachment system for attaching a first component to a second component. In particular, the present invention relates to an attachment system for attaching a built-in or mounted part of a motor vehicle to a retaining part of a motor vehicle.

When attaching two components, it is often necessary to compensate tolerances in the location of the first component relative to the location of the second component. The attachment system according to an embodiment of the invention makes such tolerance compensation possible.

2. Description of the Background Art

An attachment system for attaching two components with the aid of a compensating bush is known from DE 20 2005 016 544 U1, the compensating bush making it possible to compensate for tolerances in the location of the first component relative to the location of the second component. The compensating bush can include a sleeve-shaped member having a central axis, a cylindrical inner wall and a specially designed outer wall. The outer wall is provided with multiple ribs which are situated at an incline to the longitudinal direction of the compensating bush. To connect the two components, a screw connection is established between the first component and the compensating bush. Furthermore, the compensating bush is fixed in a bore of the second component on its circumference by means of a force-fit connection. The ribs of the compensating bush are dimensioned in such a way that a snug fit is produced between these ribs and the wall of the bore. However, the resulting force-fit connection between the second component and the compensating bush allows the compensating bush to move in the longitudinal direction, i.e., in the direction of the bush axis, relative to the second component. The sloping ribs thus offer only a corresponding amount of resistance to mobility in the longitudinal direction.

Furthermore, a tolerance compensating system is known from DE 201 19 112 U1, that includes a screw which has an outer thread in a first thread direction, which is insertable through the two components to be connected and whose head may be supported on the first component. In addition, a nut having an inner thread in an opposite second thread direction is provided which is fixedly connected to the second component. The compensating bush used in the tolerance compensating system has a continuous bore and an outer thread in a thread direction which matches the inner thread of the nut. After the compensating bush is inserted into the nut, it may be manually screwed out of the nut counter to the direction of the screw insertion in order to be adjusted in contact with the first component for the purpose of tolerance compensation. In addition to the inner thread, in the second thread direction, the nut also has an inner thread in the first thread direction which may engage with the outer thread of the screw for holding the two components together.

SUMMARY OF THE INVENTION

It is therefore an object of the present invention to provide an attachment system that may be used to variably attach two components to each other.

The attachment system according to an embodiment of the invention includes a cylindrical element having an outer lateral surface and a sleeve-shaped element having an inner lateral surface, with the aid of which the two components may be variably attached to each other. The attachment system furthermore includes at least one rib which is provided on one of the lateral surfaces of the cylindrical or sleeve-shaped elements and which is oriented largely perpendicularly to the axis of the cylindrical and sleeve-shaped elements. In addition, the attachment system includes a projection which is situated on the other lateral surface of the sleeve-shaped or cylindrical element. The rib and the projection can be provided on the cylindrical and sleeve-shaped elements in such a way that the sleeve-shaped element may be mounted on the cylindrical element, and the cylindrical element may be rotated relative to the mounted sleeve-shaped element in variable axial positions around the axis, the rib being brought into communication with the projection and the cylindrical element being thereby fixed in place relative to the mounted sleeve-shaped element in the axial direction.

The attachment system according to an embodiment the invention thus comprises two elements which may be mounted on each other in a determined relative angular position. To compensate the tolerance between the two parts, which are attached to one or the other element, the relative position of these two elements to each other may be defined in the axial direction of the two elements. The two elements are then rotated around a determined angle in relation to each other. In this rotated angular position, the rib and the projection ensure that the two elements are fixed to each other in the axial direction. The axial fixing of the two elements to each other is achieved, in particular, by the fact that the rib is oriented largely perpendicularly to the axis of the cylindrical and sleeve-shaped elements. The rib thus does not run in the manner of a screw thread at a certain inclination which permits axial relocation. The rib also does not run in a manner which is inclined toward the axis so that movement in the longitudinal direction is still possible after overcoming a determined resistance. To the contrary, the vertical orientation of the rib relative to the axis permits, from a geometric perspective, the greatest possible resistance in the axial direction against movement of the two elements relative to each other.

The rib may be provided, for example, on the cylindrical element. In this case, the projection is provided on the other element, i.e., on the sleeve-shaped element. The rib then extends outward in the radial direction from the outer lateral surface of the cylindrical element, while the projection extends inward in the radial direction from the inner lateral surface of the sleeve-shaped element. Conversely, the rib may also be provided on the sleeve-shaped element and the projection on the cylindrical element. In this case, the rib extends inward in the radial direction from the inner lateral surface of the sleeve-shaped element, and the projection extends outward in the radial direction from the outer lateral surface of the cylindrical element.

The attachment system according to an embodiment of the invention makes it possible to variably attach two components to each other, time savings being advantageously achieved when mounting one component on the other component. The quality and accuracy of repositioning the one component relative to the other component are increased. Any subsequent adjustments may be avoided thereby.

The attachment system furthermore provides a very easy means of positioning a first component, which is connected to the cylindrical element, relative to the second component, which is connected to the sleeve-shaped element, in the axial direction of the cylindrical element and to fix the component in a desired position. The attachment system according to the invention may therefore be used as a tolerance compensating system. The tolerance compensation may be carried out very quickly and easily during assembly. Furthermore, the components of the attachment system are advantageously very economical to manufacture.

In exemplary embodiments, the cylindrical element may have an outer radius R1 on an outer lateral surface. The sleeve-shaped element may have an inner ratio R2 on an inner lateral surface. The rib may extend up to a ratio R3. Furthermore, the rib may extend over a first circumferential segment of arc length B1, the first circumferential segment releasing a second circumferential segment of arc length B2 in which no rib is situated.

The projection may extend up to a radius R4 and over a third circumferential segment of arc length B3. In this case, the following relations can apply to the radii and arc lengths:

$$R1 \leq R4 < R3 \leq R2$$

and $$B3 \leq B2$$

Based on these relations, the sleeve-shaped element may be mounted on the cylindrical element in such a way that the third circumferential section is located in the area of the second circumferential section. The second circumferential section thus defines the area of the cylindrical element or the sleeve-shaped element where no rib is situated, so that the projection, which overlaps with the rib in the radial direction, may be mounted with the corresponding element in this area. However, the radial overlap between the projection and the rib ensures that the rib and the projection are brought into communication when the two elements rotate, which fixes the cylindrical element in place relative to the mounted sleeve-shaped element in the axial direction.

For example, the rib presses against the projection during rotation. This produces at least one force fit which fixes the cylindrical element in place relative to the mounted sleeve-shaped element in the axial direction.

In further exemplary embodiments of the attachment system, multiple ribs can be spaced at an axial distance apart on the outer lateral surface of the cylindrical element or on the inner lateral surface of the sleeve-shaped element. In this case, the axial width of the projection is, in particular, greater than the axial distance between adjacent ribs. The projection is thus, in particular, so wide that at least two ribs can be brought into communication with the projection when the two elements rotate. In this manner, the axial fixing of the two elements may be further improved.

In addition, multiple ribs may also be provided on a plane which is perpendicular to the axis of the cylindrical and sleeve-shaped elements. For example, the ribs each extend over an arc length which is shorter than the full circumference of the corresponding radius, so that free angular areas, in which the projection may be positioned when the two elements are mounted on each other, are defined between adjacent ribs on a plane. In this case, the number of projections and the number of ribs on the plane are, in particular, the same. This advantageously achieves a very good orientation of the sleeve-shaped element to the cylindrical element, on the one hand, and a particularly good fixing of the two elements after rotation, on the other hand.

The rib may be, in particular, a cutting element. Thus, the ribs may also be cutting elements. The rib that is designed as a cutting element can extend away from the lateral surface on which it is situated in such a way that it adjoins a longitudinal edge which serves as a cutting edge. In this case, the rib is in the shape of a knife. During rotation, the cutting element cuts into the projection or the cutting elements cut into the projection. This produces a form-locked and/or a force-fit connection which fixes the cylindrical element in place relative to the mounted sleeve-shaped element in the axial direction.

When the cutting element cuts into the projection, areas which lie on top of each other in the axial direction of the cylindrical and sleeve-shaped elements are namely produced between the cutting element and the projection, thereby preventing the two elements from moving in the axial direction. This produces a form-locked connection. Furthermore, radial forces act upon the cutting element and the projection after the cutting element has cut into the projection, which prevents both elements from moving in the axial direction due to static friction. This additionally produces a force-fit connection.

The design of the rib as a cutting element and the cutting of the cutting element into the projection while the two elements rotate relative to each other achieves a particularly effective fixing of the two elements relative to each other.

In the exemplary embodiments, the distance of the longitudinal edge of the rib from the lateral surface on which the rib is situated increases counter to the direction of rotation for producing the connection between the rib and the projection. This achieves the fact that the rotation for establishing the connection between the two elements is initially possible by applying less force, and the applied force must increase as the rotation angle increases. This advantageously achieves the fact that the two elements rotate a sufficiently far distance apart in order to be securely fixed in the axial direction. In addition, the axial width of the rib may also increase counter to the direction of rotation for establishing the connection between the rib and the projection. This also achieves the fact that the applied force increases as the rotation angle increases.

In the exemplary embodiments of the attachment system, the projection is made of a softer material than the rib or the ribs. For example, the projection may be made of a softer plastic and the rib of a harder plastic or of metal. This advantageously achieves the fact that the rib may cut into the projection or press into the projection in order to establish the form-locked or force-fit connection between the cylindrical and sleeve-shaped elements.

In the exemplary embodiments, an anti-rotation mechanism can be provided on the cylindrical and sleeve-shaped elements, which prevents the cylindrical element from rotating back relative to the mounted sleeve-shaped element after the connection between the rib and the projection has been established. This advantageously achieves the fact that, after the one element has been affixed to the other, this fixing cannot be undone, even in the event of vibrations, which may occur, for example, during motor vehicle operation.

According to one example, the anti-rotation mechanism can include a tongue provided on the sleeve-shaped element and a tab provided on the cylindrical element. The tab and tongue engage with each other after the connection between the rib and the projection has been established. Conversely, the tongue may be provided on the cylindrical element and the tab on the sleeve-shaped element.

According to a further example, the cylindrical element can have an inner axial opening. The attachment system furthermore has a bolt which may be accommodated with clearance by the inner axial opening in the cylindrical element. The outer radius of the bolt is thus smaller than the inner radius of the opening in the cylindrical element. The attachment system furthermore has a fixing component, which may be used to variably fix the bolt in place on a plane which is perpendicular to the axis of the cylindrical element. Since the radius of the bolt is smaller than the radius of the opening, the bolt may be placed in a determined position on the plane, which is perpendicular to the cylindrical plane, while the axis of the bolt remains parallel to the axis of the cylindrical element. In this position, the bolt is then fixed in place by the fixing component. The fixing component may include, for example, a screw connection. If the one component is now attached to the bolt and the other component to the sleeve-shaped element, the two components may be variably fixed in all three spatial directions, so that a three-dimensional tolerance compensating system is provided.

According to an embodiment of the invention, an attachment device for a built-in or mounted part of a motor vehicle can be provided on a retaining part of the motor vehicle. The fastening device can include the attachment system described above. In particular, the sleeve-shaped element can be connectable to the built-in or mounted part and the cylindrical element can be connectable to the retaining part. The built-in or mounted part of the motor vehicle may be, for example, a headlamp or light housing or a headlamp module or a light module which is attached to the motor vehicle by multiple attachment systems according to embodiments of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The exemplary embodiments described below illustrate as an example the attachment of a headlamp housing to a motor vehicle at multiple attachment points. Tolerance compensation can be carried out with the aid of attachment system 1. However, other built-in parts or mounted parts of a vehicle or any other piece of equipment may also be variably attached to another component in the same manner with the aid of attachment system 1.

Figure 1:
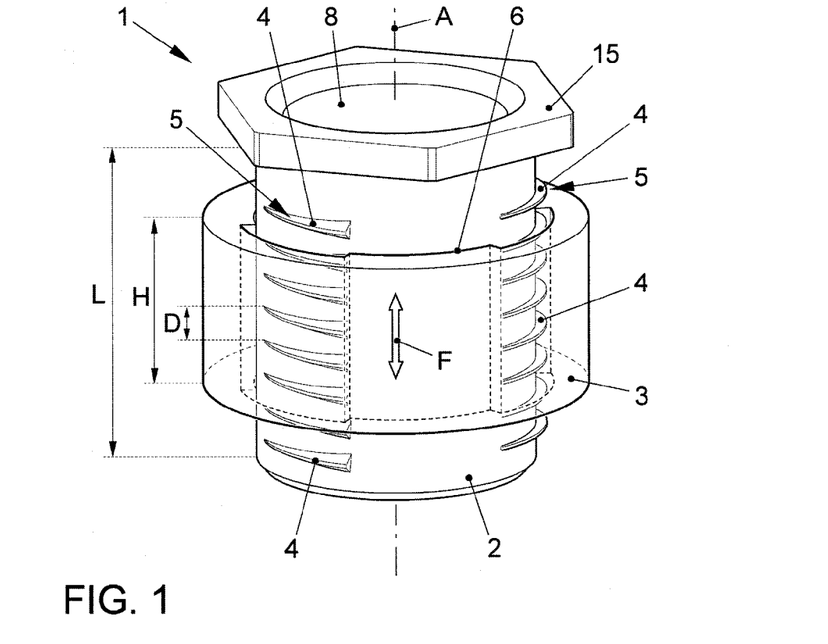
FIG. 1 shows a perspective view of an exemplary embodiment of the attachment system according to an embodiment of the invention.
Figure 2:
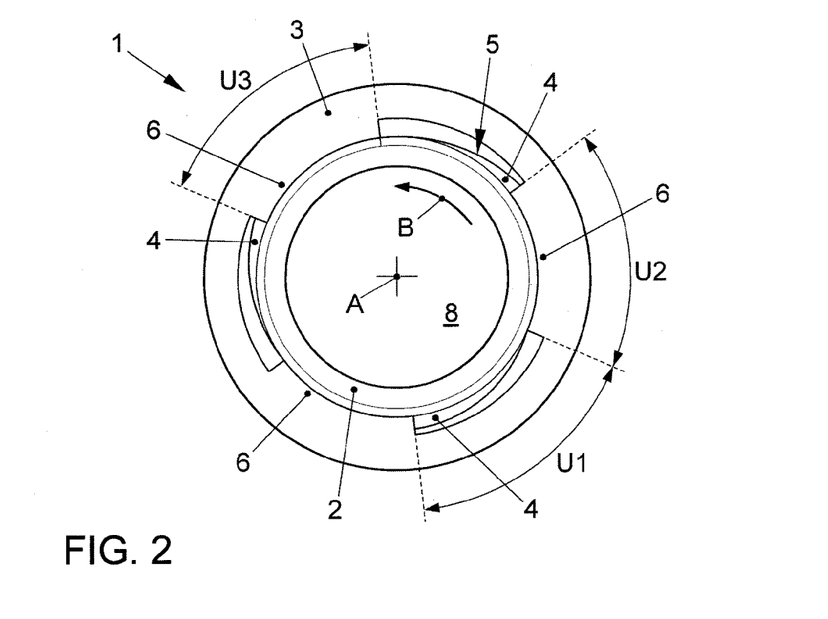
FIG. 2 shows a cross section of the exemplary embodiment illustrated in FIG. 1 along a plane which is perpendicular to axis A.

As shown in FIGS. 1 and 2, attachment system 1 comprises a cylindrical element 2. Cylindrical element 2 may have a contact surface on its lower end face which enables it to rest against, for example, a mounting support. On its upper end face, cylindrical element 2 has a nut 15 or a collar where a tool may used in order to rotate cylindrical element 2 around axis A of this element 2. Cylindrical element 2 furthermore includes an opening 8 via which a first component may be connected to cylindrical element 2, as explained below.

Multiple ribs, which can be configured as cutting elements 4, are provided on the outer lateral surface of cylindrical element 2. Cutting elements 4 have an outer longitudinal edge 5 which acts as a cutting edge. The rib is thus in the shape of a knife. Cutting elements 4 or ribs are oriented largely perpendicularly to axis A. The plane defined by longitudinal edge 5 is oriented substantially perpendicularly to axis A.

Multiple cutting elements 4 of this type are provided at a distance from each other in the axial direction, i.e., in a direction which is parallel to axis A of cylindrical element 2. The distance between two adjacent cutting elements 4 is identified by D. In addition, a plurality of cutting elements 4 may be provided on a plane which is perpendicular to axis A. FIG. 2 shows an arrangement of cutting elements 4 on a plane of intersection of this type. In the illustrated exemplary embodiment, three cutting elements 4 are provided on each plane which is perpendicular to axis A; in each case, eight cutting elements 4, spaced a distance apart, are provided in the axial direction so that a total of 24 cutting elements 4 are provided.

On the outer lateral surface of cylindrical element 2, cutting elements 4 extend over a first circumferential segment U1 of arc length B1. Cutting elements 4 thus occupy a determined angle segment of this cross section of cylindrical element 2. However, a second circumferential segment U2 of arc length B2 results between two adjacent cutting elements 4 on this plane. No cutting elements 4 or ribs of another design are provided in this second circumferential segment.

In the representation according to FIG. 2, the distance of longitudinal edge 5 of cutting elements 4 from the lateral surface of cylindrical element 2 increases in the clockwise direction, i.e., in the direction counter to arrow B. Similarly, the axial width of cutting elements 4 increases counter to direction of rotation B, i.e., in the clockwise direction. Cutting element 4 is thus higher and wider in the direction counter to direction of rotation B.

Attachment system 1 also includes a sleeve-shaped element 3. The second component, which is variably connected to the first component, which is connected to cylindrical element 2, is attached to this sleeve-shaped element 3. Sleeve-shaped element 3 has an inner lateral surface which is dimensioned in such a way that sleeve-shaped element 3 may be mounted on cylindrical element 2 from below, as illustrated in FIG. 1. The axis of sleeve-shaped element 3 coincides with axis A of cylindrical element 2.

A projection 6 is provided on the inner lateral surface of sleeve-shaped element 3. This projection 6 extends over a third circumferential segment U3 of arc length B3 on the inner lateral surface of sleeve-shaped element 3. The size of projection 6 in both the radial and circumferential directions is selected in such a way that sleeve-shaped element 3 may be mounted on cylindrical element 2 only if projection 6 is positioned on second circumferential segment U2 of cylindrical element 1, on which no cutting elements 4 or ribs are provided. When sleeve-shaped element 3 is in an angular position relevant to cylindrical element 2, in which projection 6 is positioned in the area of cutting elements 4, sleeve shaped element 3 may not be mounted on cylindrical element 2, since projection 6 bumps against lowest cutting element 4 in the axial direction. The dimensioning work needed for this purpose is explained on the basis of FIG. 3.

When three cutting elements 4 are situated at a distance from each other on a plane, three projections 6 may also be provided on the inner lateral surface of sleeve-shaped element 3, it being possible to position these three projections in the spaces between cutting elements 4.

Figure 3:
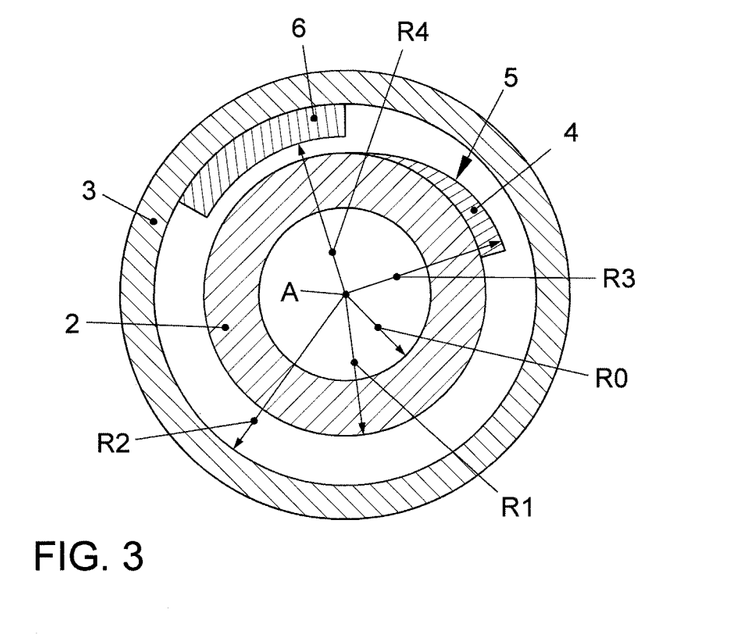
FIG. 3 shows a schematic representation for illustrating the radii.

Cylindrical element 2 and sleeve-shaped element 3 are oriented concentrically to each other so that axes A coincide. Cylindrical element 2 has a radius R0 for opening 8 and a radius R1 on the outer lateral service. Longitudinal edges 5 of cutting elements 4 extend up to a radius R3. As explained above, the radius provided by longitudinal edge 5 increases in the clockwise direction.

The inner lateral surface of sleeve-shaped element 3 has a radius R2. Projection 6 extends from the inner lateral surface of sleeve-shaped element 3 up to a radius R4. The following relation applies to the radii:

$$R1 \leq R4 < R3 \leq R2.$$

Since radius R1 is smaller than radius R2, sleeve-shaped element 3 may be mounted on cylindrical element 2. However, since radius R4 is smaller than radius R2, sleeve-shaped element 3 may be mounted on cylindrical element 2 only in an angular position in which no cutting elements 4 are provided. The following also applies:

$$B3 \leq B2.$$

The arc length of projection 6 is thus smaller than or equal to arc length B2 of circumferential segment U2 in which no cutting elements 4 are provided. These size ratios ensure that sleeve-shaped element 3 may be mounted on cylindrical element 2 as shown in FIG. 1.

Projections 6 and thus, in particular, sleeve-shaped element 3, extend over a height H in the axial direction. This height H is greater than distance D between two axially adjacent cutting elements 4. Height H of sleeve-shaped element 3 extends, in particular, over multiple cutting elements 4, e.g., over five cutting elements 4. However, height H is smaller than length L of the portion of cylindrical element 2 on which sleeve-shaped element 3 may be mounted. This ensures that sleeve-shaped element 3 may be variably attached to cylindrical element 2 in the axial direction.

Sleeve-shaped element 3 may now be positioned relative to cylindrical element 2 in the axial direction, i.e., in the direction of arrow F in FIG. 2. For example, it is possible to perform a necessary tolerance compensation between the two components which are connected to cylindrical and sleeve-shaped elements 2, 3. In the desired relative axial position of sleeve-shaped element 3, cylindrical element 2 is subsequently rotated in the direction of arrow B (FIG. 2), for example with the aid of a tool and nut 15. Sleeve-shaped element 3, which is attached to the second component, remains fixed in place. During this rotation, cutting element 4 is brought into communication with projection 6 of sleeve-shaped element 3. Cutting element 4 cuts into projection 6 via its longitudinal edge 5. Since the radius and axial width of cutting element 4 increase counter to direction of rotation B, cutting element 4 cuts all the deeper into projection 6, the farther cylindrical element 2 is rotated in the direction of arrow B.

Since cutting elements 4 are oriented perpendicularly to axis A of cylindrical and sleeve-shaped elements 2, 3, cylindrical element 2 is thereby fixed in place relative to mounted sleeve-shaped element 3 in the axial direction.

In order for cutting elements 4 to be able to cut into projections 6, they are made of a harder material than projections 6. Cutting elements 4 and possibly also associated cylindrical element 2 may be made, for example, of a hard plastic or of metal. Projections 6 and possibly also associated sleeve-shaped element 3 may be made, for example, of a softer plastic. After rotation, a force fit and a form-locked connection are established between cylindrical element 2 and sleeve-shaped element 3 via cutting elements 4 and projections 6.

A variable self-cutting locking action between two components may thus be established by attachment system 1. The relative position of sleeve-shaped element 3 to cylindrical element 2 is infinitely adjustable in the axial direction.

Figure 4:
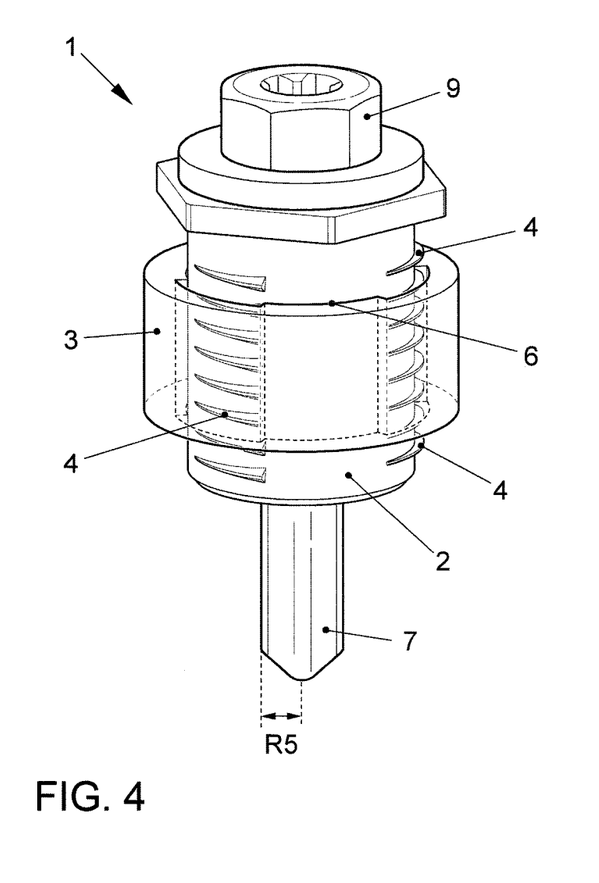
FIG. 4 shows a further exemplary embodiment of the attachment system according to an embodiment of the invention.

In addition, attachment system 1 may be used to carry out tolerance compensation on a plane which is oriented perpendicularly to axis A. For this purpose, attachment system 1 includes a bolt 7 which has a radius R5. Radius R5 is smaller than radius R0 of opening 8 in cylindrical element 2. Bolt 7 may thus be accommodated with clearance by inner axial opening 8 in cylindrical element 2. Bolt 7 may be positioned in inner opening 8 in a defined position in a direction perpendicular to axis A, the axis of bolt 7 being oriented parallel to axis A of cylindrical element 2. In this position, bolt 7 may be fixed in place with the aid of a fixing component 9, for example during attachment to the first component. Fixing component 9 may be, for example, a screw connection to first component.

During mounting, the position of sleeve-shaped element 3 relative to cylindrical element 2 in the axial direction is first set, and the relative position of sleeve-shaped element 3 to cylindrical element 2 in the axial direction is then fixed by rotating cylindrical element 2. Bolt 7, which is inserted snugly into an opening in the first component, is then positioned on the plane perpendicular to axis A and subsequently fixed in place with the aid of fixing component 9, e.g., by tightening a screw. In this manner, two components may be variably attached to each other in all three spatial dimension. Fixing with the aid of the screw connection has the further advantage that cylindrical element 2 is clamped by the screw connection, i.e., a force fit is established which prevents cylindrical element 2 from rotating back counter to the direction of arrow B in FIG. 2. This provides an anti-rotation mechanism which prevents cylindrical element 2 from rotating back, e.g., due to vibrations during operation of the motor vehicle, and thereby prevents the connection to sleeve-like element 3 from being released again.

Figure 5:
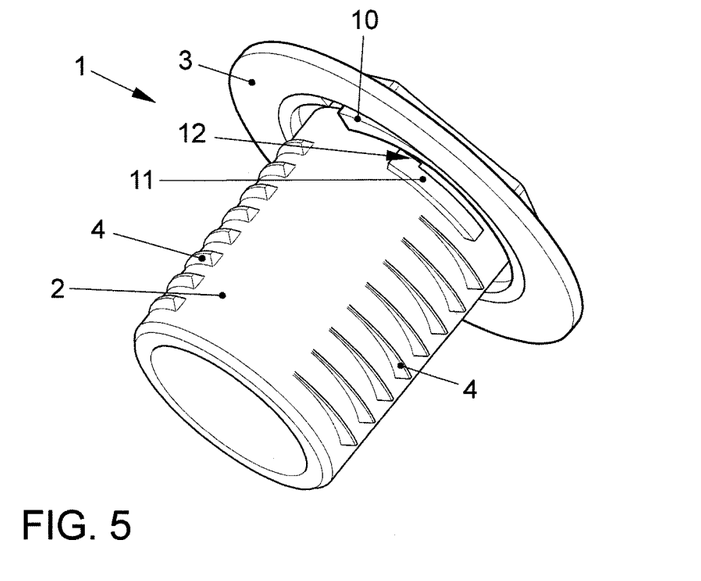
FIG. 5 shows another exemplary embodiment of the attachment system according to an embodiment of the invention.
Figure 6:
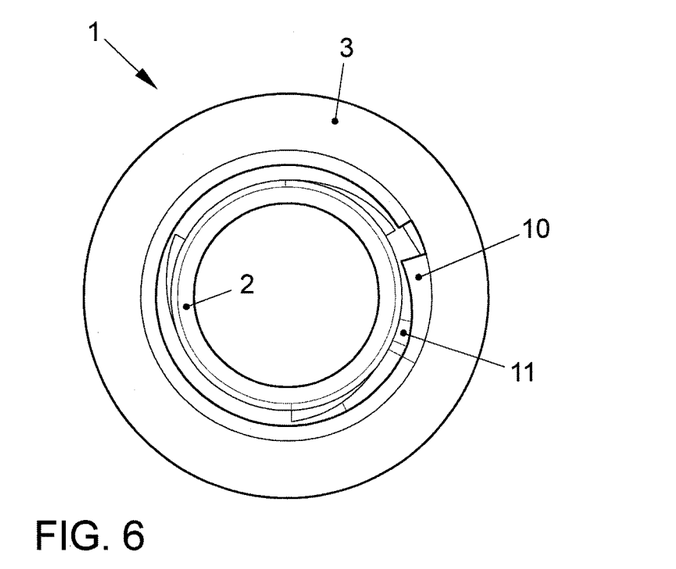
FIG. 6 shows a cross section of the exemplary embodiment illustrated in FIG. 5.

An alternative or additional embodiment of an anti-rotation mechanism is explained with reference to FIGS. 5 through 8:

In this alternative or additional anti-rotation mechanism, a tongue 10 is provided on sleeve-shaped element 3, which, like projection 6, extends radially towards the inside from the inner lateral surface. On the circumference of sleeve-shaped element 3, tongue 10 can be arranged in a same area as projection 6, so that tongue 10 does not hinder the mounting of sleeve-shaped element 3 on cylindrical element 2 in the corresponding angular position. Multiple tongues 10 may also be provided on a plane which is perpendicular to axis A; in particular, the same number of tongues 10 and projections 6 are provided. However, it is enough for only one tongue 10 to serve as the anti-rotation mechanism.

Figure 7:
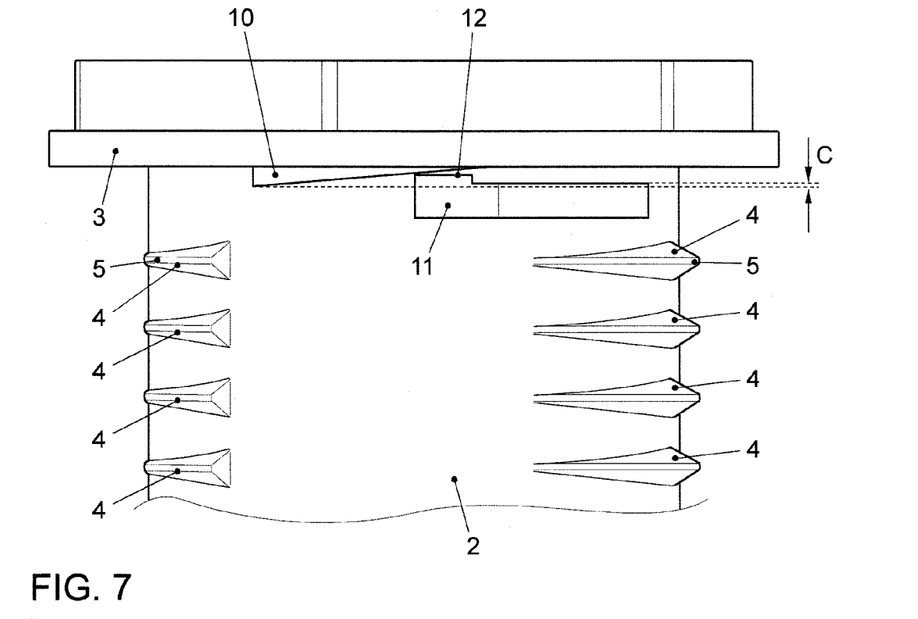
FIG. 7 shows a detailed view of the exemplary embodiment illustrated in FIG. 5.
Figure 8:
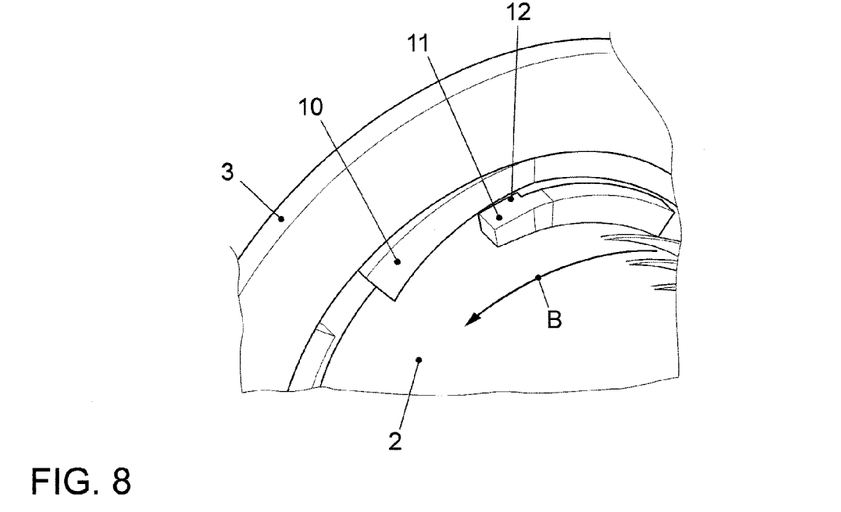
FIG. 8 shows a further detailed view of the exemplary embodiment illustrated in FIG. 5.

Furthermore, the alternative or additional anti-rotation mechanism can include a projection 11 on cylindrical element 2 having a tab 12. When cylindrical element 2 rotates to establish the connection between cutting elements 4 and projections 6, resilient tongue 10 is pressed up and/or laterally by tab 12 and springs back behind tab 12 so that it is no longer possible for cylindrical element 2 to rotate back. The tension under which cylindrical element 2 is tightened against sleeve-shaped element 3 is determined by distance C of tongue 10 from a plane of projection 11, as illustrated in FIG. 7. In an alternate embodiment as illustrated in FIG. 8, the projection 11 can be pressed down and/or laterally by the resilient tongue 10.

Figure 9:
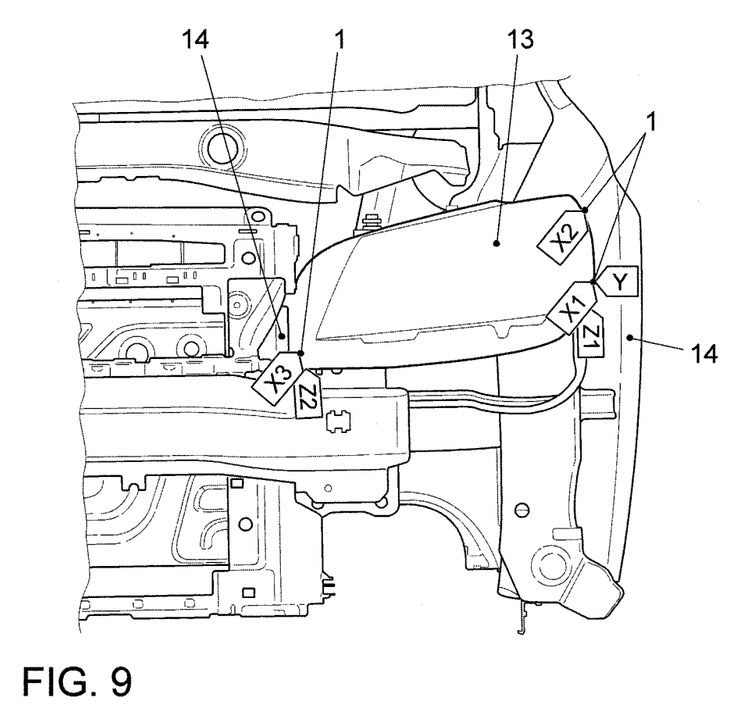
FIG. 9 shows the attachment of a first component to a second component with the aid of multiple attachment systems according to the invention.

FIG. 9 shows the attachment of a headlamp housing 13 to a retaining part 14 of a vehicle body. Three of the attachment systems 1 described above are provided for attachment. As described above, headlamp housing 13 may be moved in the direction of axis A of attachment systems as well as on the planes perpendicular thereto, leaving a certain clearance, in order to compensate tolerances and to orient the headlamps relative to reference points of the vehicle. After alignment, cylindrical element 2 is affixed to sleeve-shaped element 3 by means of rotation. Furthermore, bolts 7 are fixed on the plane which is perpendicular to axis A with the aid of fixing component 9 at least in a portion of attachment systems 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An attachment system for attaching a first component to a second component, the attachment system comprising:
    a cylindrical element having an outer lateral surface;
    a sleeve-shaped element having an inner lateral surface, the first and second component being attachable to one another via the cylindrical element and the sleeve-shaped element;
    at least one rib arranged on the outer lateral surface of the cylindrical element or the inner lateral surface of the sleeve-shaped element, the rib being oriented substantially perpendicularly to an axis of the cylindrical and sleeve-shaped elements; and
    a projection which is arranged on the other lateral surface of the sleeve-shaped or cylindrical element, the projection having a flat surface,
    wherein the rib and the projection are arranged on the cylindrical and sleeve-shaped elements such that the sleeve-shaped element is mountable on the cylindrical element, and such that the cylindrical element is rotatable relative to the mounted sleeve-shaped element in variable axial positions about the axis, and
    wherein the rib is brought into communication with the projection to thereby fixedly hold the cylindrical element relative to the mounted sleeve-shaped element in the axial direction,
    wherein the at least one rib comprises a cutting element having a longitudinal edge,
    wherein a distance of the longitudinal edge from the outer lateral surface of the cylindrical element or the inner lateral surface of the sleeve-shaped element increases from a first end of the cutting element to a second end of the cutting element,
    wherein an axial width of the rib increases from the first end of the cutting element to the second end of the cutting element, and
    wherein the cylindrical element has an inner axial opening and the attachment system includes a bolt that is accommodated with a clearance within the inner axial opening in the cylindrical element and that includes a threaded fixing component that is configured to threadably engage the inner axial opening in the cylindrical element to engage the bolt and variably fix the bolt in place on a plane that is perpendicular to the axis of the cylindrical element.

2. The attachment system according to claim 1, wherein the cylindrical element on the outer lateral surface has an outer radius R1 and the sleeve-shaped element on the inner lateral surface has an inner radius R2; wherein the rib extends towards a radius R3 and over a first circumferential segment of an arc length B1, wherein a second circumferential segment, in which no rib is situated, has an arc length B2; wherein the projection extends up to a radius R4 and over a third circumferential segment of the arc length B3, and wherein the following applies:

$$R1 \leq R4 < R3 \leq R2$$

and $$B3 \leq B2,$$

so that the sleeve-shaped element is mountable on the cylindrical element.

3. The attachment system according to claim 1, wherein the rib presses against the projection during a rotation and thereby produces at least one force fit that fixes the cylindrical element in place relative to the mounted sleeve-shaped element in the axial direction.

4. The attachment system according to claim 1, wherein multiple ribs are spaced at an axial distance apart and are situated on the outer lateral surface of the cylindrical element or on the inner lateral surface of the sleeve-shaped element, and wherein an axial width of the projection is greater than an axial distance between adjacent ribs.

5. The attachment system according to claim 1, wherein the cutting element cuts into the projection during a rotation thereof thereby creating a form-locked connection and/or a force fit that fixedly holds the cylindrical element relative to the mounted sleeve-shaped element in the axial direction.

6. The attachment system according to claim 1, wherein the distance of the longitudinal edge of the rib from the lateral surface on which the rib is arranged increases counter to a direction of rotation for producing a connection between the rib and the projection.

7. The attachment system according to claim 1, wherein the axial width of the rib increases counter to a direction of rotation for establishing a connection between the rib and the projection.

8. The attachment system according to claim 1, wherein the projection is made of a softer material than the rib such that the rib deforms the projection upon rotation.

9. The attachment system as recited in claim 1, wherein the at least one rib is arranged on the outer lateral surface of the cylindrical element.

10. The attachment system as recited in claim 9, wherein the at least one rib is disposed along less than an entirety of the outer lateral surface of the cylindrical element such that the outer lateral surface contains at least one region void of the at least one rib.

11. The attachment system as recited in claim 10, wherein a size of the projection corresponds to a size of the at least one region.

12. The attachment system as recited in claim 10, wherein the sleeve-shaped element is mountable on the cylindrical element only if the projection is positioned on the at least one region.

13. The attachment system according to claim 1, wherein the longitudinal edge extends continuously along an entire length of the rib.

14. The attachment system according to claim 1, wherein the projection is devoid of ribs.

15. An attachment device for a built-in or mounted part of a motor vehicle on a retaining part of the motor vehicle, having a fastening system that comprises:
- a cylindrical element having an outer lateral surface and a sleeve-shaped element having an inner lateral surface, via which a first component and a second component are adapted to be variably attached to each other;
- at least one rib that is arranged on one of the lateral surfaces of the cylindrical or sleeve-shaped elements and that is oriented substantially perpendicularly to an axis of the cylindrical and sleeve-shaped elements; and
- a projection which is arranged on the other lateral surface of the sleeve-shaped or cylindrical element, the projection having a flat surface,
- wherein the rib and the projection are arranged on the cylindrical and sleeve-shaped elements such that the sleeve-shaped element is mountable on the cylindrical element, and such that the cylindrical element is rotatable relative to the mounted sleeve-shaped element in variable axial positions around the axis,
- wherein the rib is brought into communication with the projection thereby fixedly holding the cylindrical element in place in the axial direction relative to the mounted sleeve-shaped element,
- wherein the at least one rib comprises a cutting element having a longitudinal edge,
- wherein a distance of the longitudinal edge from the outer lateral surface of the cylindrical element or the inner lateral surface of the sleeve-shaped element increases from a first end of the cutting element to a second end of the cutting element,
- wherein an axial width of the rib increases from the first end of the cutting element to the second end of the cutting element, and
- wherein the cylindrical element has an inner axial opening and the attachment system includes a bolt that is accommodated with a clearance within the inner axial opening in the cylindrical element and that includes a threaded fixing component that is configured to threadably engage the inner axial opening in the cylindrical element to engage the bolt and variably fix the bolt in place on a plane that is perpendicular to the axis of the cylindrical element.

16. The attachment device as recited in claim 15, wherein the sleeve-shaped element is configured to be connected to the built-in or mounted part and the cylindrical element is configured to be connected to the retaining part.

17. An attachment system for attaching a first component to a second component, the attachment system comprising:
- a cylindrical element having an outer lateral surface;
- a sleeve-shaped element having an inner lateral surface, the first and second component being attachable to one another via the cylindrical element and the sleeve-shaped element;
- at least one rib arranged on the outer lateral surface of the cylindrical element or the inner lateral surface of the sleeve-shaped element, the rib being oriented substantially perpendicularly to an axis of the cylindrical and sleeve-shaped elements; and
- a projection which is arranged on the other lateral surface of the sleeve-shaped or cylindrical element, the projection having a flat surface,
- wherein the rib and the projection are arranged on the cylindrical and sleeve-shaped elements such that the sleeve-shaped element is mountable on the cylindrical element, and such that the cylindrical element is rotatable relative to the mounted sleeve-shaped element in variable axial positions about the axis,
- wherein the rib is brought into communication with the projection to thereby fixedly hold the cylindrical element relative to the mounted sleeve-shaped element in the axial direction,
- wherein the rib presses against the projection during a rotation and thereby produces at least one force fit that fixes the cylindrical element in place relative to the mounted sleeve-shaped element in the axial direction, and
- wherein the cylindrical element has an inner axial opening and the attachment system includes a bolt that is accommodated with a clearance within the inner axial opening in the cylindrical element and that includes a threaded fixing component that is configured to threadably engage the inner axial opening in the cylindrical element to engage the bolt and variably fix the bolt in place on a plane that is perpendicular to the axis of the cylindrical element.

* * * * *